United States Patent
Huber-Buschbeck et al.

(10) Patent No.: US 8,494,925 B2
(45) Date of Patent: Jul. 23, 2013

(54) SYSTEMS AND METHODS FOR PROCESSING AN ORDER

(75) Inventors: Andreas Huber-Buschbeck, Helligkreuzsteinach (DE); Hans-Ulrich Von Helmolt, Heidelberg (DE); Patricia Luz-Wagner, Stuttgart (DE); Guenther Deeg, St. Ingbert (DE)

(73) Assignee: SAP AG, Walldorf (DE)

( * ) Notice: Subject to any disclaimer, the term of this patent is extended or adjusted under 35 U.S.C. 154(b) by 1012 days.

(21) Appl. No.: 11/515,947

(22) Filed: Sep. 6, 2006

(65) Prior Publication Data
US 2007/0106411 A1 May 10, 2007

(30) Foreign Application Priority Data
Sep. 7, 2005 (EP) .................................... 05108221

(51) Int. Cl.
*G06Q 10/00* (2012.01)
*G06G 1/14* (2006.01)

(52) U.S. Cl.
USPC .............................................. 705/28; 705/22

(58) Field of Classification Search
None
See application file for complete search history.

(56) References Cited

U.S. PATENT DOCUMENTS

| | | | |
|---|---|---|---|
| 6,868,396 B2* | 3/2005 | Smith et al. .................. | 705/26.9 |
| 2003/0172007 A1* | 9/2003 | Helmolt et al. ................. | 705/28 |
| 2004/0139001 A1* | 7/2004 | Henriques et al. .............. | 705/39 |

* cited by examiner

*Primary Examiner* — Fahd Obeid
(74) *Attorney, Agent, or Firm* — Finnegan, Henderson, Farabow, Garrett & Dunner, L.L.P.

(57) ABSTRACT

Systems and methods are provided for administrating an order. In one embodiment, a computer-implemented method is provided. The method includes the steps of receiving, by a first participant, a customer order and checking the availability of an ordered quantity of products within a first group of inventory data objects. Further, the availability of the ordered quantity of products is checked within a second group of inventory data objects, if the ordered products were not found within the first group. The checking may be repeated for additional groups until the ordered products are found or any further group is no longer available. Thereafter, the ordered quantity of products is delivered to the customer.

14 Claims, 6 Drawing Sheets

SYSTEMS AND METHODS FOR PROCESSING AN ORDER

BACKGROUND

I. Technical Field

The present invention generally relates to the field of data processing and to computerized systems and methods for managing the order and delivery processes within, for example, an electronic or e-business system that may include procurement systems, sales information systems, logistic information systems, or supply chain management systems. More particularly, and without limitation, the invention relates to methods and systems for managing inventory within at least one supply chain management system.

II. Background Information

Today, successful companies must fill customer orders for goods and/or services precisely, on time, and in a cost efficient manner. Accordingly, many companies use supply chain management systems to control and optimize their production and delivery processes. Supply chain management includes processes that control the flow of goods, services, information, and/or finances between parties such as manufactures, suppliers, wholesalers, retailers, and consumers. These processes may include, among others, order processing, information feedback, and timely delivery of the ordered goods and/or services.

One aspect of supply chain management is the administration of the inventory in a plurality of warehouses. Each warehouse may be located with a participant (e.g., manufacturer, dealer, middleman or supplier) that is involved in the supply chain. In the supply chain, a participant can act either as a supplier or as a customer. Each participant manages his own inventory whereby the stock may be located with other participants.

In supply chain management systems, stock may be maintained as inventory data objects by the owner of the inventory. The owner of the inventory data objects does not have any information concerning inventory data objects that are owned by other participants within the supply chain management system. Furthermore, the owner does not have any information concerning stock that is located with a third participant outside the company and that might be stored as inventory data objects in another supply chain management system. Accordingly, systems and methods disclosed herein are directing to overcoming one or more of these problems.

SUMMARY

In one embodiment, a computer-implemented method administrates a plurality of inventory data objects. The inventory data objects may represent inventories. The inventory data objects may be owned either by a first participant or by further participants. A first group of inventory data objects may belong to the first participant and further groups of inventory data objects in each case may belong to one of the further participants. The method may include the steps of receiving, by the first participant, a customer order, the order specifying a predetermined quantity of products, determining a first group of inventory data objects, searching the first group of inventory data objects for the ordered products, checking the availability of the ordered quantity of products within the first group of inventory data objects, determining a further group of inventory data objects, searching the further group of inventory data objects for the ordered products, checking the availability of the ordered quantity of products within the further group of inventory data objects, repeating the steps of determining, searching and checking for further groups until the ordered products are found or the checking confirms the ordered quantity of products or any further group of inventory data objects is no longer available, and delivering the ordered quantity of products to the customer.

Embodiments of the method may check whether or not the predetermined quantity of products is available within an in-house location. If the predetermined quantity of products is not available within the in-house location, the method may check whether the predetermined quantity of products is available within external locations.

In one embodiment, a first participant may take into account the inventory of further participants in order to fulfill a customer order. Therefore, the first participant may access a plurality of inventory data objects provided by further participants. If one of the further participants provides the ordered quantity of products, the first participant may forward the customer order to the further participant. The customer may receive a confirmation of the customer order by the first participant.

In another embodiment, searching the first group of inventory data objects includes performing a product replacement for the ordered products if the ordered products were not found within the first group of inventory data objects. An ordered product may be replaced by another product based on a replacement rule. The first group of inventory data objects may be searched for the replaced products. The product replacement and searching may be repeated until the products are found or any replacement is no longer possible.

In one embodiment, if the products are not found within an in-house location, a product replacement may be performed in order to confirm the required quantity of products from the in-house location. If the products were not found within the in-house location after performing several product replacements, the method may further include analyzing a plurality of criteria to establish a sequence of the further groups of inventory data objects. The further groups of inventory data objects may be searched for the required quantity of products according to a predetermined sequence. The criteria that define this sequence may depend on different requirements (e.g., transportation costs or a distance between customer and dealer). Different requirements about the delivery may be considered by using different criteria (e.g., if the ordered products should be delivered as fast as possible, the criterion may be the distance between customer and dealer).

In another embodiment, the criterion comprises at least one of geographical location of the participants, geographical distance between the participants and the customer, or response time after receiving a customer order by the participants. An inventory data object may comprise at least an ID representative of the inventory data object, an ID representative of the product location, an ID representative of the product, and a number representative of the available quantity. The inventory data objects may be stored as time series and vary over the time. Furthermore, the time series may be used to estimate a demand forecast of required quantity of products.

In another embodiment, the available quantity of products within an inventory data object is reduced automatically if the availability check confirms the ordered quantity of products. Furthermore, methods consistent with the present invention may include a plurality of methods for processing the inventory data objects and an interface for accessing the plurality of methods. The methods for processing the inventory data objects may be adapted for performing at least one of inserting inventory data objects, updating inventory data objects, removing inventory data objects, reading inventory data objects, searching the plurality of inventory data objects for one or more inventory data objects according to one or more search criteria, displaying one or more inventory data objects, and monitoring the plurality of inventory data objects.

In another embodiment, methods for processing the inventory data objects and the interface may be adapted to support online collaboration between the participants. Several participants, such as dealers, may provide their inventory data objects to other participants, such as manufacturers. Accordingly, a manufacturer may access the inventory data objects of several dealers. The inventory data objects may be included in the availability check if an in-house location does not confirm the required quantity of products. Therefore, the manufacturer may fulfill the customer order even if the in-house location does not provide the ordered quantity of products.

In yet another embodiment, a computer-framework or system administrates a plurality of inventory data objects. The inventory data objects may represent inventories. The inventory data objects may be owned either by a first participant or by further participants. A first group of inventory data objects may belong to the first participant and further groups of inventory data objects in each case belong to one of the further participants. The computer-framework may include one or more data storages to store the plurality of inventory data objects, means for accessing and processing the plurality of inventory data objects, a plurality of means for checking the availability of an ordered quantity of products within a plurality of inventory data objects, and an interface providing concurrent access to the plurality of means.

In one embodiment, the computer-framework may further include means to receive a customer order, means to determine a group of inventory data objects, means to search a group of inventory data objects for the ordered products, and means to check the availability of the ordered quantity of products within a group of inventory data objects. Further, the computer-framework may include means for performing a product replacement for the ordered products if the ordered products were not found within the group of inventory data objects and means for analyzing a plurality of criteria to establish a predetermined sequence of a group of inventory data objects.

In still yet another embodiment, a computer-readable storage medium is provided that includes program code for determining a group of inventory data objects, searching the group of inventory data objects for the ordered products, checking the availability of the ordered quantity of products within the group of inventory data objects, performing a product replacement for the ordered products if the ordered products were not found within a group of inventory data objects, and analyzing a plurality of criteria to establish a sequence of groups of inventory data objects.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
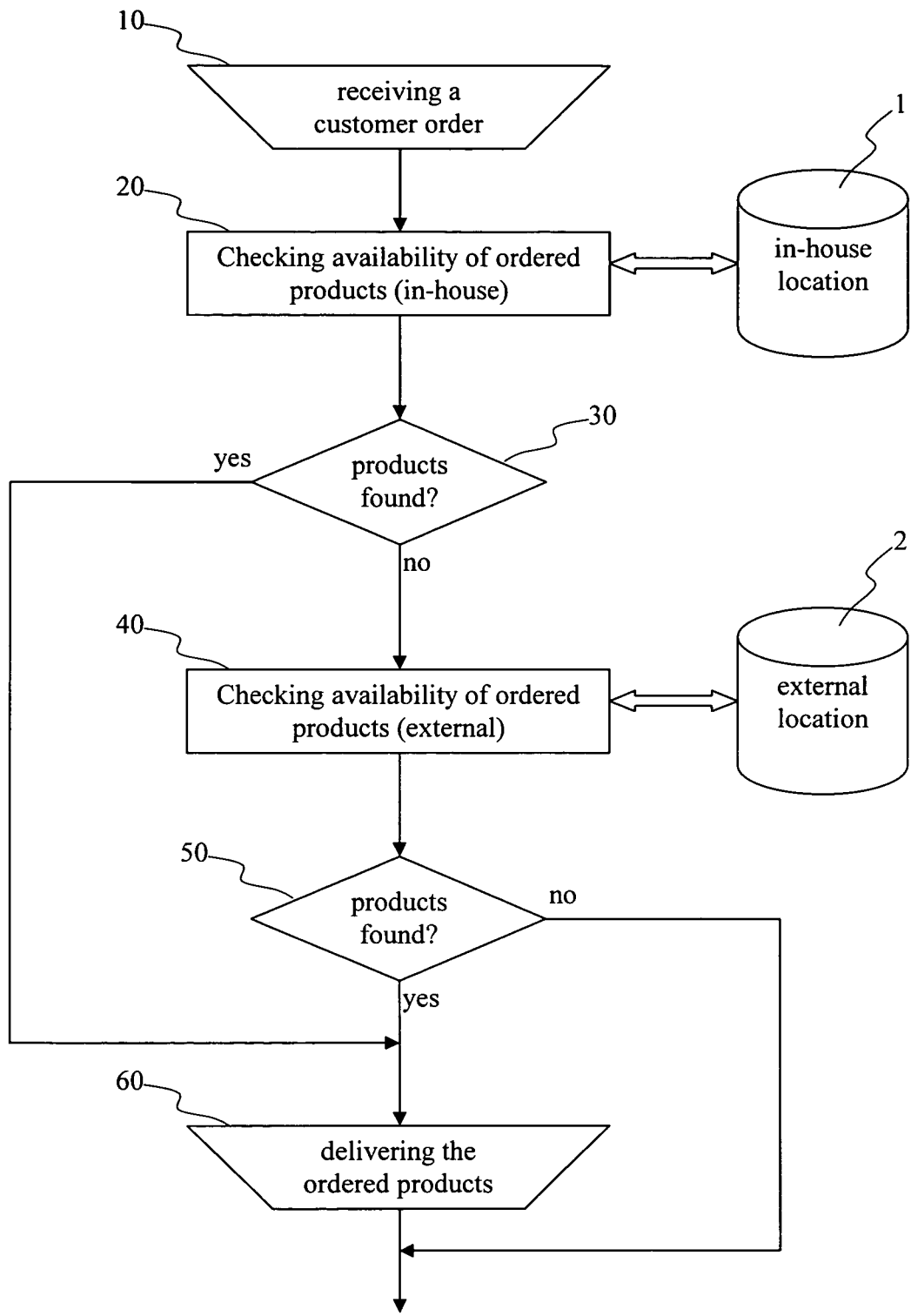
FIG. 1 is a flow diagram of an exemplary method, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

In a supply chain, dealers are a special kind of business partners. They can either act as a customer or as a supplier for other customers. Embodiments of the present invention may involve dealers who act as suppliers whereby a manufacturer sells the products owned by the dealer by order of the dealer.

FIG. 1 is a flow diagram of an exemplary method, consistent with an embodiment of the present invention. After receiving a customer order by a first participant (step 10), the first participant checks the availability of the ordered products in one or more in-house locations 1 (step 20). The in-house locations 1 may be different geographical locations. If the required quantity of products are not found within the in-house locations 1 (step 30), the process continues to step 40. In step 40, the first participant checks the availability of the ordered products in one or more external locations 2. These external locations may be owned by other participants.

The result of step 40 is evaluated in step 50. In step 50, if availability is not confirmed, the required quantity of products are neither available in the in-house locations 1 nor in the external locations 2. In this case, the process may end by rejecting the customer order to the customer. In other embodiments, the process can continue with additional processes to meet the customers demand.

Referring again to step 30, if the process confirms the availability of the ordered products, the process continues to step 60. In step 60, the process delivers the products from one or more in-house locations 1 to the customer. If, however, the availability of the ordered products were confirmed in step 50, the ordered products are delivered (also shown as step 60) from one or more external locations 2 to the customer.

Figure 2:
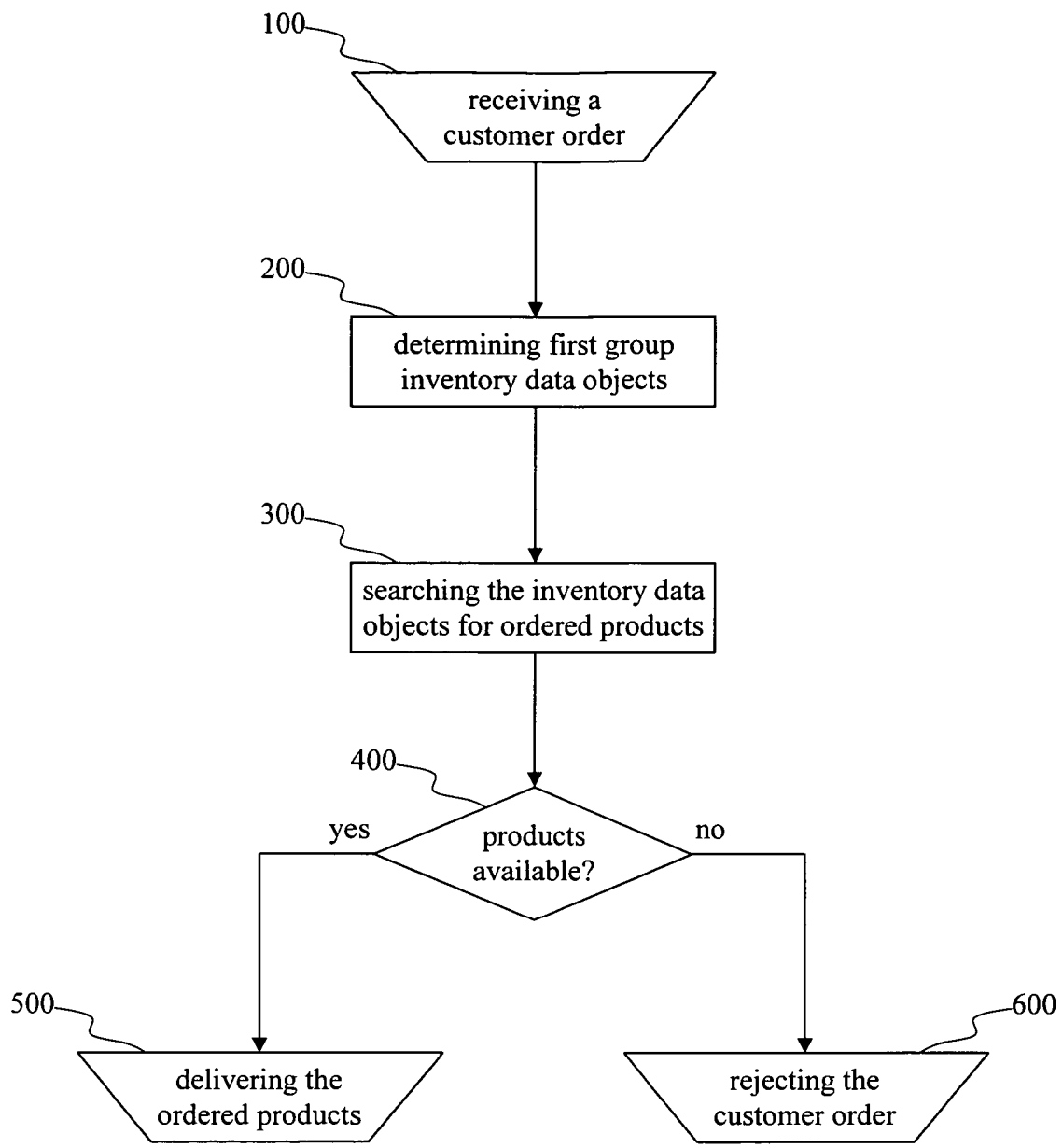
FIG. 2 is a flow diagram of another exemplary method, consistent with an embodiment of the present invention.

FIG. 2 is a flow diagram of another exemplary method, consistent with an embodiment of the present invention. In this embodiment, the inventory is stored as inventory data objects within a supply chain management system. The inventory data objects comprise inventory data objects which are owned by different participants (e.g., supplier, dealer or manufacturer) within the supply chain management system. Assume, for example, that a first group of inventory data objects is owned by a first participant. In addition, other groups of inventory data objects are owned by further participants. The further groups of inventory data objects in each case belong to one of the further participants. In one embodiment, the supply chain management system is located with the first participant and the first participant has at least read access to all inventory data objects. Furthermore, the inventory data objects of the first group belong to a first location, which is an in-house location of the first participant. Further groups of inventory data objects belong to further locations, which are the external locations.

In one embodiment, an inventory data object is stored as a data structure that includes at least the following items:
(1) an ID representative of the inventory data object;
(2) an ID representative of the product;
(3) a number representative of the available quantity; and
(4) an ID representative of the product location.

The first item (1) is the unique identifier of an inventory data object. The second item (2) is the identifier of the product within an inventory data object and the third item (3) represents the available quantity of the product stored in an inventory data object. The fourth item (4) stores information about the product location. In this embodiment, three different values may be used to differentiate several types of locations, such as:

$Loc_1$ for in-house locations;
$Loc_2$ for external locations; and
$Loc_3$ for external locations which are handled by the availability check within the supply chain management system like in-house locations.

At the start of the process in FIG. 2, in step 100, a customer order is received by the first participant as, for example, an electronic order transmitted by email or a traditional order transmitted by mail. The customer order specifies at least a predetermined quantity of products. The first participant feeds the data about the customer order into the supply chain management system which processes this order.

In step 200, a first group of inventory data objects are determined. This first group of inventory data objects may comprise those inventory data objects that have stored the value $Loc_1$ or $Loc_3$ within the fourth item (4) of the above-described data structure.

After determining the first group of inventory data objects, in step 300, the first group of inventory data objects are searched and, if required, further groups of inventory data objects are searched for the ordered products.

Next, in step 400, it is evaluated whether or not the ordered products are available. If they are available, the products are delivered to the customer depending on which location has confirmed the required quantity during the availability check. Otherwise, the process goes to step 600 and the customer order is rejected by the first participant to the customer.

Figure 3:
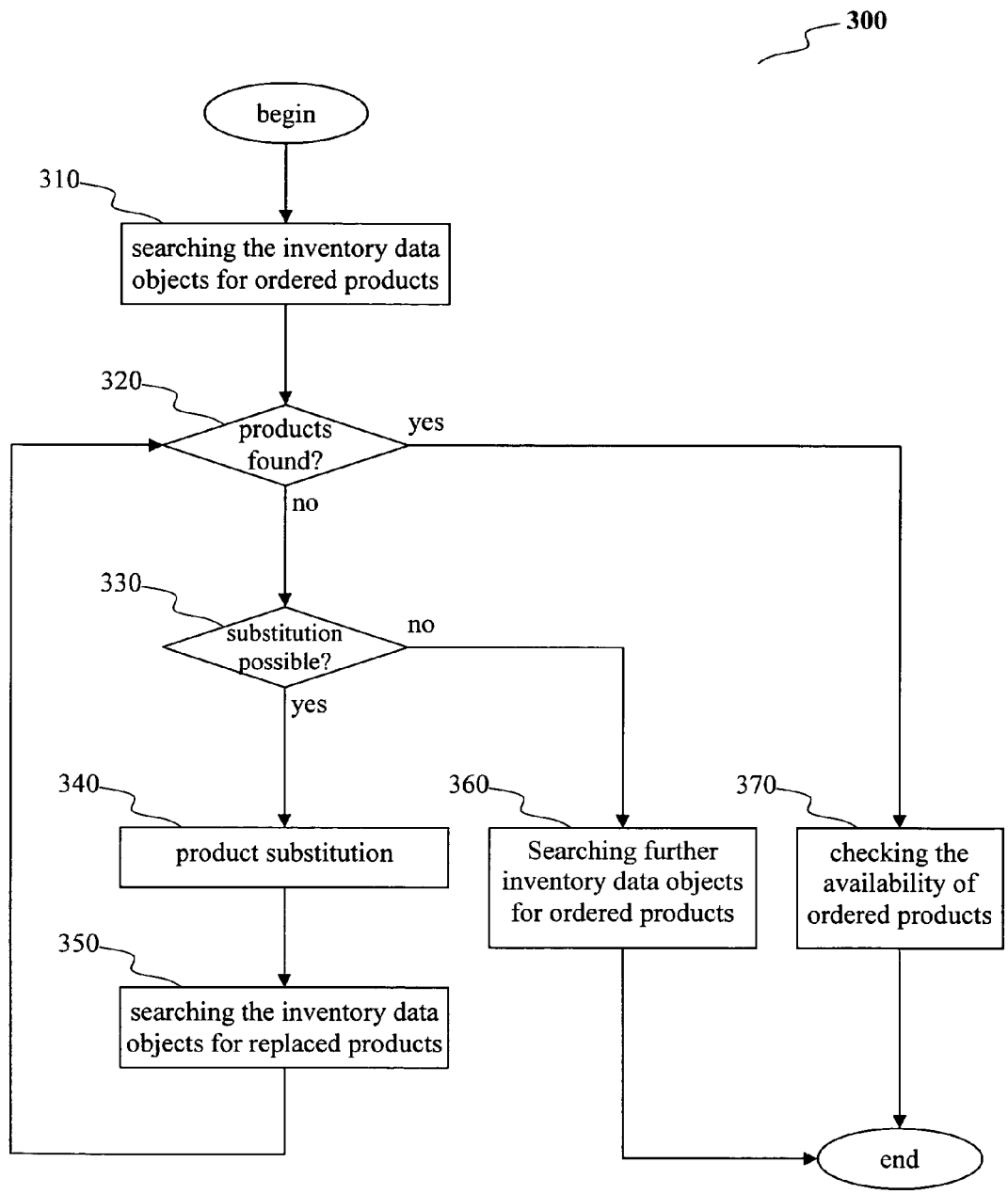
FIG. 3 is a more detailed flow diagram of step 300 of FIG. 2, consistent with an embodiment of the present invention.

FIG. 3 is a more detailed flow diagram of step 300, as shown in FIG. 2. In step 310, the first group of inventory data objects is searched for the ordered product. The result of step 310 is evaluated by step 320.

If the searched product was found, in step 370, the availability of the product is checked considering the third item (3) of the data structure with respect to the product. Otherwise, if the product was not found, the process continues to step 330. In step 330, it is checked whether a product replacement is possible. If it is possible, a product replacement occurs in step 340.

In one embodiment, a product replacement replaces the ordered product by another product based on one or more replacement rules. One replacement rule may be "products with same price" or another rule may be "products with same measure." Other rules for product replacement are also possible.

Next, in step 350, the inventory data objects are searched for the replaced product in the same way as in step 310. After step 350, the process returns to step 320. The loop between step 320 and step 350, comprising the steps 330 and 350, may be repeated until the searched product was found or any product replacement is no longer possible. If no further product replacement is possible, the method proceeds from step 330 to step 360. In step 360, a sub-method of searching further groups of inventory data objects for the ordered product is performed.

Figure 4:
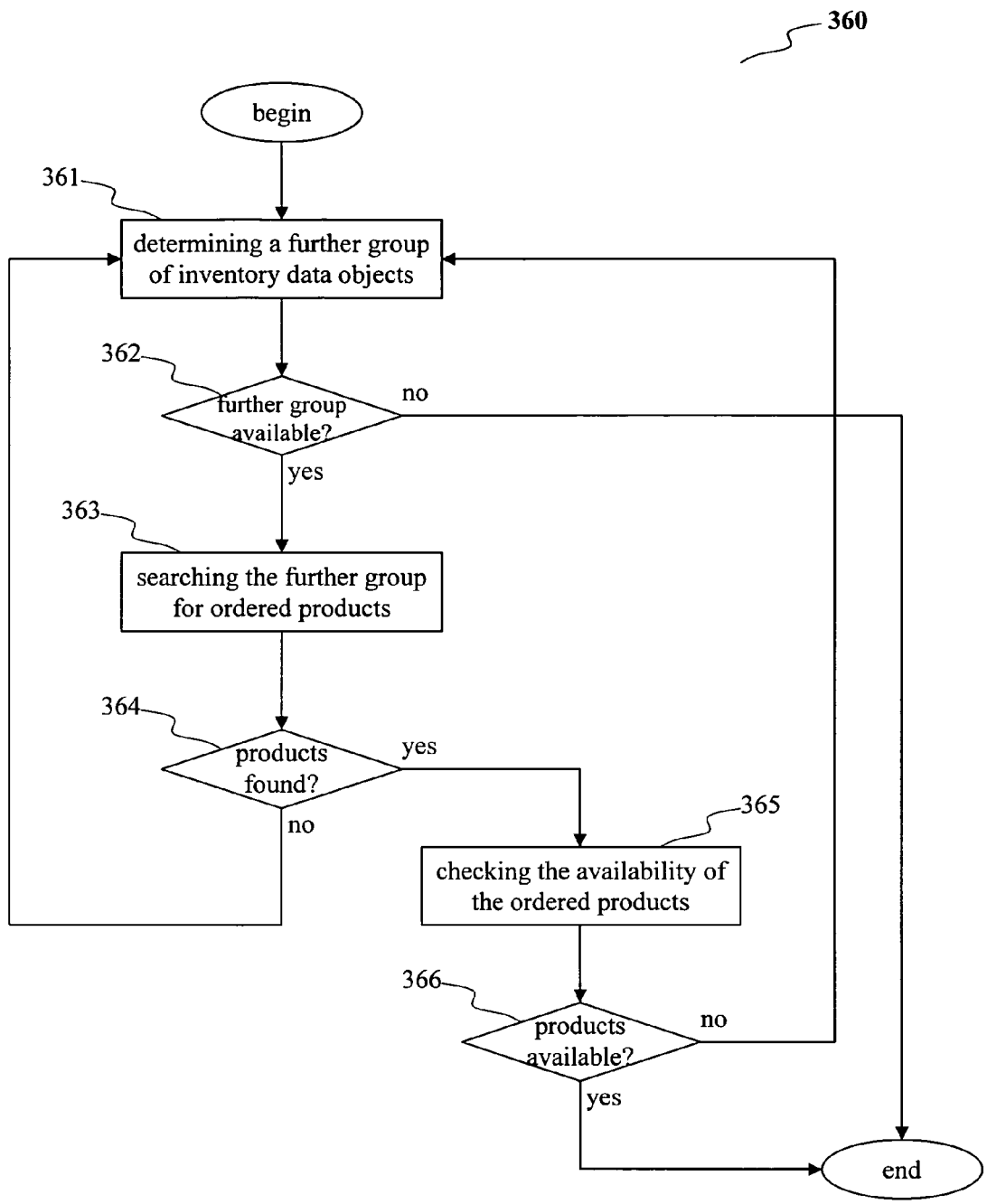
FIG. 4 is a more detailed flow diagram of step 360 of FIG. 3, consistent with an embodiment of the present invention.

FIG. 4 is a more detailed flow diagram of step 360, as shown in FIG. 4. Beginning with step 361, the process determines a further group of inventory data objects. The further group does not comprise the inventory data objects which are searched in the previous steps 310-350. In this embodiment, the further group may include inventory data objects that have the value $Loc_2$ in the fourth item (4) of the above-mentioned data structure. If step 361 locates further inventory data objects, an evaluation is performed in step 362, and the process proceeds to step 363. In step 363, the process searches the further inventory data objects for the ordered, not for the replaced, product. Unlike the previous steps 310-350, the step 363 does not perform any product replacement during the search.

If the product was found, an evaluation is performed in step 364, and the process continues with step 365. In step 365, the process checks the availability in the same manner than the step 370 shown in FIG. 3. The availability is evaluated in the step 366. If the product is available within the further group of inventories, the sub-method ends and the process returns to step 400 shown in FIG. 2.

If no product is found, the process returns after step 364 to step 361. A further determination of a group of inventory data objects will be done. The method passes through steps 361-364 until the searched product was found within the viewed inventory data objects or any group of inventory data objects is no longer available. In one embodiment, where only one external location $Loc_2$ is defined the method passes the loop once only. In the second loop, the method leaves the sub-method and returns to step 400 shown in FIG. 2.

In other embodiments, step 361 determines more than one group of inventory data objects at once. These groups are ordered by one or more criteria. The criterion may include the geographical location of the participants or the geographical distance between the participants and the customer or the response time after receiving an customer order by the participants. Steps 362-364 may process the groups of inventory data objects in the order determined by step 361.

In the above steps, the available quantity of products within the inventory data objects may be reduced if the availability check confirms the required quantity of products.

Figure 5:
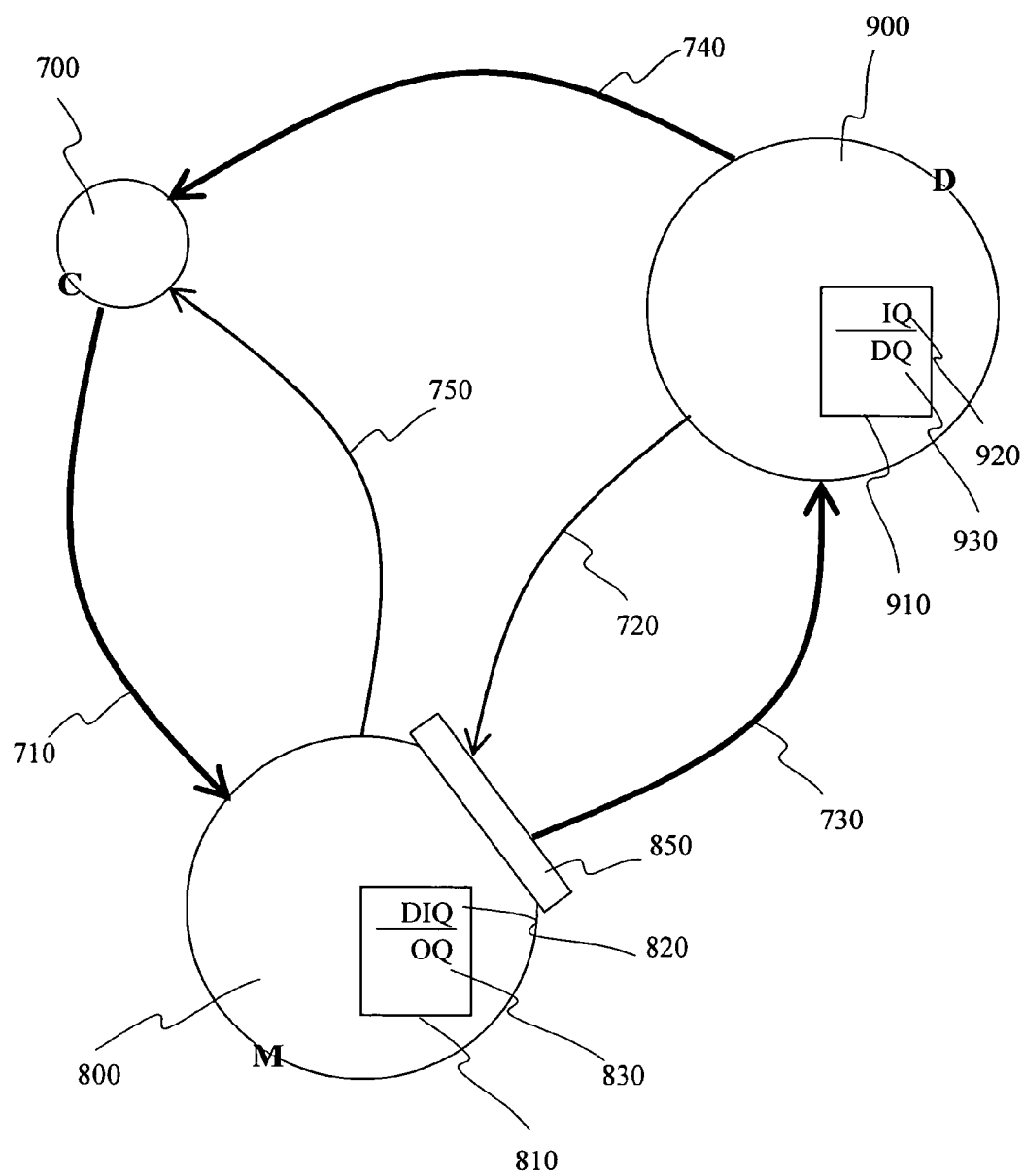
FIG. 5 is a flow diagram of an exemplary delivery process, consistent with an embodiment of the present invention.

FIG. 5 is an overview of an exemplary delivery process, consistent with an embodiment of the present invention, when a customer order cannot be fulfilled by a manufacturer. For example, a customer 700 sends an order to a manufacturer 800 (710). Manufacturer 800 forwards the relevant part of the order to dealer 900 (730). Dealer 900 delivers the ordered goods according to the relevant part of the customer order to customer 700 (740). Manufacturer 800 sends a confirmation of the order to customer 700 (750). In this embodiment, manufacturer 800 represents a first participant and dealer 900 represents a second participant.

Customer 700 may place an order of a predetermined quantity of goods with manufacturer 800. The order may be an electronic order transmitted by email or a traditional order transmitted by mail. The order comprises at least information about the ordered products and quantity. Manufacturer 800 feeds the data about the order into a supply chain management system which processes this order.

Dealer 900 may send his own inventory data 910 to the supply chain management system of manufacturer 800 using interface 850 that is located with the supply chain management system (720). The dealer may also use a supply chain management system or any other computer-system (e.g., Microsoft® Excel), which is able to establish a connection to interface 850.

At the manufacturer's location 800, the transferred inventory data may be stored in a inventory data object 810. In one embodiment, a multiple of inventory data objects 810 are stored as time series in one or more data storages. Each inventory data object may comprise at least the following items:

(1) an ID representative of the inventory data object;
(2) an ID representative of the owner of the inventory data object;
(3) a ID representative of a product;
(4) a number representative of the product allocation within this inventory data object (DIQ—Dealer Inventory Quantity); and
(5) a number representative of the sold quantity of products within the product allocation (OQ—Ordered Quantity).

In this embodiment, the first item (1) is the unique identifier of the stored inventory data object. The second item (2) represents the owner of this inventory data object. In other embodiments, further dealers may participate in the supply chain. More dealers may provide their inventory data to manufacturer 800. Therefore, the system may store the unique identifier of the dealer which owns the inventory data object. The third item (3) represents the unique identifier of the stored product within a inventory data object. The fourth item (4) or 820 (DIQ) specifies the product allocation—the quantity of products—of the product within the inventory data object. The fifth item (5) or 830 (OQ) represents the sum of the confirmed quantities by the availability checks with respect to this product. The available quantity is given by the difference between the entry of item four and the entry of item five. In one embodiment, checking the availability has to be done against this difference whereby the new available quantity is given by increasing the quantity stored in item five.

In other embodiments, the fifth item (5) may not be stored within the inventory data object. In this case, the fourth item (4) represents the available quantity of goods and the above mentioned availability check has to perform a check against item four whereby the new available quantity is given by decreasing the quantity stored in item four. Since the inventory data objects are stored in time series, the dealer has the option to maintain different dealer inventory data objects for one product with respect to different time periods, e.g., months. A dealer may provide a quantity of N for a first month and a quantity of M for a second month of a product to the manufacturer. The above-mentioned availability check may be done with respect to the viewed time period.

As shown in the example of FIG. 5, stock is located with dealer 900. In this embodiment, dealer 900 uses also a supply chain management system. The stock is stored within this supply chain management system as inventory data objects 910 which comprise at least a first item 920 (IQ—Inventory Quantity) representative of the quantity of products on stock and a second item 930 (DQ—Delivered Quantity) representative of the delivered quantity of products. After receiving the forwarded relevant part of a customer order, the supply chain management system of dealer 900 performs an availability check against inventory data objects 910. The second availability check occurs because the inventory with dealer 900 must not be the same as the dealer inventory with manufacturer 800.

Figure 6:
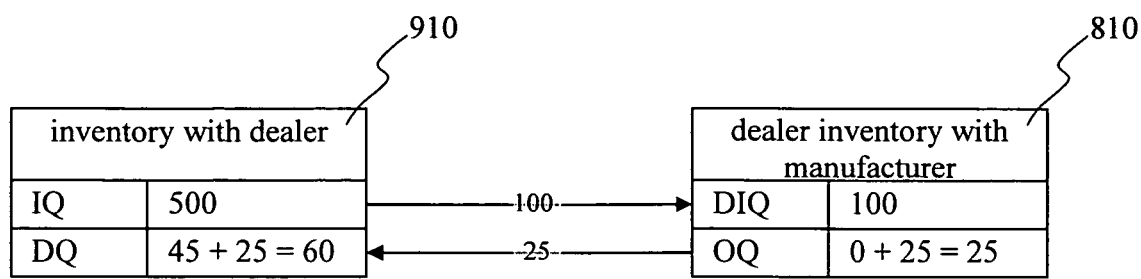
FIG. 6 is a diagram of exemplary inventories of a dealer and a manufacturer, consistent with an embodiment of the present invention.

FIG. 6 is a diagram of exemplary inventories of a dealer and a manufacturer, consistent with an embodiment of the present invention. As shown in FIG. 6, inventory 910 is associated with dealer 900 and dealer inventory 810 is associated with manufacturer 800. In this example, the dealer has 500 pieces of a product on the stock whereby 45 pieces are already sold. Dealer 900 provides 100 pieces of these 500 pieces to manufacturer 800. Initially, the ordered quantity OQ is set equal to 0. After the availability check for 25 required pieces, the ordered quantity OQ is set equal to 25 (0+25). The customer order of 25 pieces is forwarded by the manufacturer to the dealer. After delivering the ordered 25 pieces, the delivered quantity DQ is increased to 60 (45+25). In this example, the delivered quantity DQ changes even if no customer order is forwarded by the manufacturer. The dealer can sell his own products directly to his customer without having received a customer order from the manufacturer. In this example, the dealer sold 45 pieces before the customer order of 25 pieces.

In another embodiment, dealer 900 may send an update of his new reduced available quantity to manufacturer 800 after a delivery process. This update may be done simultaneously or delayed. If the update is done in a delayed manner, a product shortage is possible and has to be handled by the dealer. In both cases, dealer 900 may use interface 850 (see FIG. 5) provided by the supply chain management system located with the manufacturer 800.

In one embodiment, interface 850 provides access to at least one of the following methods, whereby the methods may be part of the supply chain management system:

(1) inserting one or more inventory data objects into a plurality of data storages;
(2) updating one or more inventory data objects;
(3) removing an inventory data object from the data storages;
(4) reading inventory data objects;
(5) searching the plurality of inventory data objects for one or more inventory data objects with one or more search criteria;
(6) displaying one or more inventory data objects; and
(7) monitoring the plurality of inventory data objects.

The first three methods may support the update process performed by a dealer. These three methods are available only for the owner of the inventory data objects or for the manufacturer. The first method provides inserting of a new inventory data object into a data storage. The second method provides updating of a plurality or of one dedicated inventory data object respectively. With method three, a dealer may remove an inventory data object from the data storages.

Methods four to seven provide access to inventory data objects which are owned by other dealers such that inventory data objects which are owned by other dealers may be read and displayed. Method five allows searching the plurality of inventory data objects for one or more inventory data objects according to one or more search criteria. It is also possible to get an overview which dealer can provide a specific product.

Accordingly, manufacturer 800 sells the products to his own customer 700 in order of dealer 900, whereby the ordered products, which are located with the dealer and managed within the supply chain management system with the manufacturer, are delivered by the dealer to the customer. Furthermore, interface 850 may provide access to the inventory data objects stored with the manufacturer and owned by different dealers. A dealer may also read inventory data objects which are owned by other dealers.

Systems and methods disclosed herein may be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, embodiments of the present invention may be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Further, computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for administering an order comprising the steps, implemented by a computer, of:
    receiving, at a first participant, a customer order that specifies a predetermined quantity of products;
    generating, by a processor of the first participant, a first group of inventory data objects, the first group of inventory data objects representing inventory owned by the first participant;
    receiving, by an interface accessible to the first participant, a second group of inventory data objects from a second participant external to the first participant, the second group of inventory data objects:
        representing the inventory owned by the second participant,
        identifying an available portion of the inventory owned by the second participant; and
        identifying the second participant;
    searching, with the processor of the first participant, the first group of inventory data objects for the ordered products;
    searching, at the first participant, the first group of inventory data objects for replacement products if the ordered products are not located within the first group of inventory data objects;
    checking availability of the ordered quantity of products if the ordered products or replacement products are located within the first group of inventory data objects;
    searching, at the first participant, the second group of inventory data objects for the ordered products if the ordered products and replacement products are not located or are not available within the first group of inventory data objects,
    analyzing the first or second group of inventory data objects to estimate a demand forecast of the ordered products,
    maintaining the order as unconfirmed if the ordered products are not located within the second group of inventory data objects;

checking availability of the ordered quantity of products if the ordered products are located within the second group of inventory data objects; wherein the first, or second group of inventory data objects are stored in a time series, and each of the first or second group of inventory data objects comprises at least an ID representative of the Inventory data object, an ID representative of the product location, an ID representative of the product or a number representative of the available quantity.

2. The method of claim 1, wherein searching the first group of inventory data objects for replacement products comprises:

performing a product replacement for the ordered products, whereby an ordered product is replaced by another product based on a replacement rule;

searching the first group of inventory data objects for the replaced products; and repeating the product replacement and searching until the products are located or replacement is no longer possible.

3. The method of claim 2, further comprising:

analyzing a plurality of criteria to establish a sequence of the additional groups of inventory data objects.

4. The method of claim 3, wherein the criterion comprises at least one of a geographical location of the participants, a geographical distance between the participants and the customer, and a response time after receiving an customer order by the participants.

5. The method of claim 1, wherein the available quantity of products within an inventory data object is reduced automatically if the availability check confirms the ordered quantity of products.

6. A computer-readable medium storing programmable instructions adapted to perform a method for administering an order when executed by at least one processor of at least one computer associated with a first participant, the method comprising the steps of:

receiving a customer order that specifies a predetermined quantity of products;

generating a first group of inventory data objects, the first group of inventory data objects representing inventory owned by the first participant;

receiving, by an interface accessible to the first participant, a second group of inventory data objects from a second participant external to the first participant, the second group of inventory data objects:

representing inventory owned by the second participant;

identifying an available portion of the inventory owned by the second participant; and identifying the second participant;

searching the first group of inventory data objects for the ordered products;

searching the first group of inventory data objects for replacement products if the ordered products are not located within the first group of inventory data objects;

checking availability of the ordered quantity of products if the ordered products or replacement products are located within the first group of inventory data objects;

searching the second group of inventory data objects for the ordered products if the ordered products and replacement products are not located or are not available within the first group of inventory data objects, analyzing the first or second group of inventory data objects to estimate a demand forecast of the ordered products, maintaining the order as unconfirmed if the ordered products are not located within the second group of inventory data objects; and checking availability of the ordered quantity of products if the ordered products are located within the second group of inventory data objects; wherein the first or second group of inventory data objects are stored in a time series; and each of the first or second group of inventory data objects comprises at least an ID representative of the inventory data object, an ID representative of the product location, an ID representative of the product, or a number representative of the available quantity.

7. The computer-readable medium of claim 6, further comprising:

analyzing a plurality of criteria to establish a sequence of groups of inventory data objects.

8. The method of claim 1, further comprising:

forwarding at least a portion of the customer order from the first participant to the second participant if at least some of the ordered products are determined to be available within the second group of inventory data objects.

9. The method of claim 1, wherein the first participant is a manufacturer and the second participant is a dealer.

10. The computer-readable medium of claim 6, the method further comprising:

forwarding at least a portion of the customer order from the first participant to the second participant if at least some of the ordered products are determined to be available within the second group of inventory data objects.

11. The computer-readable medium of claim 6, wherein the first participant is a manufacturer and the second participant is a dealer.

12. The method of claim 1, wherein each of the inventory data objects include a unique identifier of the inventory data object, an identifier representative of the product, a number representative of the available quantity, and information representative of the product location.

13. The method of claim 1, wherein the second group of inventory data objects are managed by the second participant, and wherein the second group of inventory data objects cannot be modified by the first participant.

14. The method of claim 1, further comprising:

receiving, by an interface accessible to the first participant, a third group of inventory data objects from a third participant external to the first participant, the third group of inventory data objects:

representing the inventory owned by the third participant;

identifying an available portion of the inventory owned by the third participant; and identifying the second participant; and searching, at the first participant, the third group of inventory data objects for the ordered products if the ordered products and replacement products are not located or are not available within the first group of inventory data objects and the second group of inventory data objects.

\* \* \* \* \*